D. J. KERSTETTER.
VEHICLE BODY.
APPLICATION FILED MAY 26, 1909.
970,238.
Patented Sept. 13, 1910.
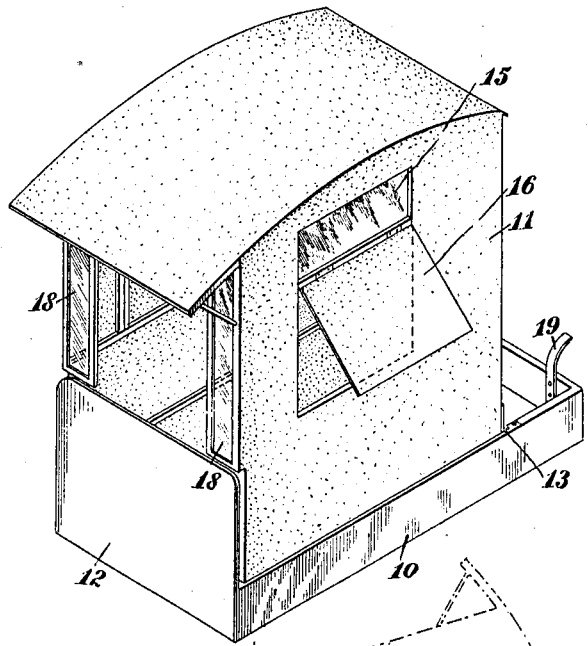
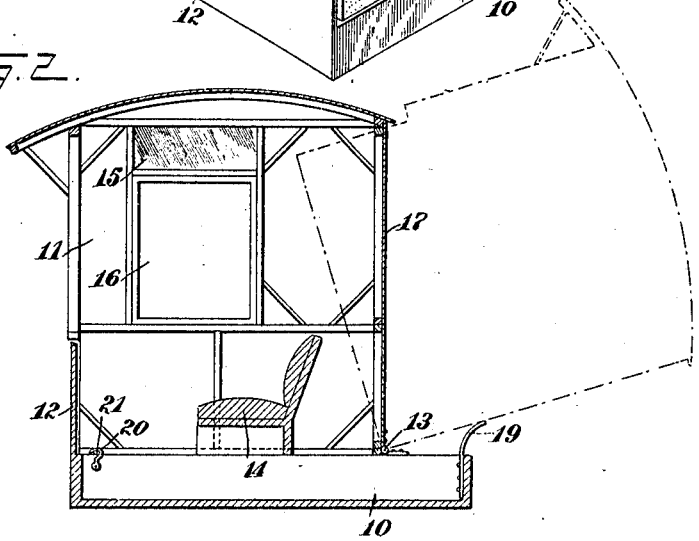
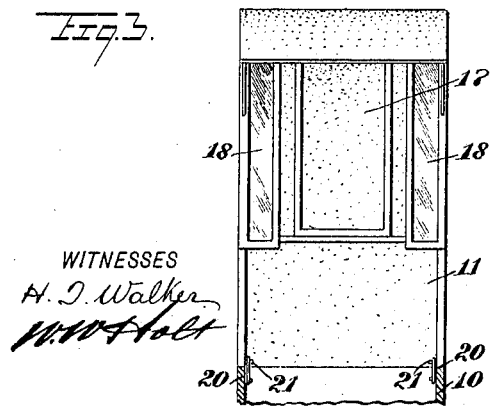
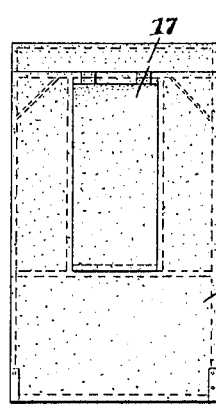
WITNESSES
H. J. Walker
INVENTOR
Davis J. Kerstetter
BY
ATTORNEYS

UNITED STATES PATENT OFFICE.

DAVIS J. KERSTETTER, OF GREEN RIDGE, MISSOURI.

VEHICLE-BODY.

970,238.  Specification of Letters Patent.  Patented Sept. 13, 1910.

Application filed May 26, 1909. Serial No. 498,408.

*To all whom it may concern:*

Be it known that I, DAVIS J. KERSTETTER, a citizen of the United States, and a resident of Green Ridge, in the county of Pettis and State of Missouri, have invented a new and Improved Vehicle-Body, of which the following is a full, clear, and exact description.

The invention has in view a vehicle body suitable for dispensing or distributing purposes in all kinds of weather, and is more especially designed for use by mail carriers. In arriving at a construction fulfilling these conditions I provide a vehicle bed, preferably of conventional box form, and a cab having a rigid frame hinged at the lower rear edge to the bed to swing rearwardly as a unit from over the bed, whereby either an open or closed conveyance may be had, the cab frame being covered with canvas or equivalent material and having suitable windows for ventilation and for passing out the mail.

Reference is to be had to the accompanying drawings forming a part of this specification, in which similar characters of reference indicate corresponding parts in all the views.

Figure 1 is a perspective view of a vehicle body constructed in accordance with my invention; Fig. 2 is a central vertical longitudinal section through the same; Fig. 3 is a front end view of the body, showing the bed in section; and Fig. 4 is a rear end view of the body.

The body is composed of two primary parts, viz: a bed 10 and a cab 11, the bed being of a conventional box form having a floor, front, rear and side walls, with the front wall extended to form a dash-board 12, and the cab being constructed of a rigid, light frame covered with canvas or similar material and hinged at its rear bottom edge to the side walls of the bed, as indicated at 13. The sides of the cab frame are each formed with a substantial window opening convenient to the driver's or carrier's seat 14, each window opening having an upper glass pane 15 for the admission of light, and a window 16 hinged at its top edge in the lower portion, the window 16 when swung outwardly, as indicated in Fig. 1, offering a protection to the carrier's arm and mail matter when the latter is passed within the boxes along the route. The rear end of the cab, as shown in Fig. 4, is also provided with a window 17, likewise hinged at the top, and is for the purpose of admitting light and air when the weather is favorable. The front of the cab, when the cab is in operative position, is arranged close to the dash-board, which closes the lower portion thereof, and is provided with vertical glass panels 18 at opposite sides in the plane of the dash-board, thus leaving a convenient opening for a view ahead and for the passage of the reins. This opening may be closed if desired in bad weather, by a storm curtain.

The bed 10 of the vehicle body is substantially longer than the cab and its rear end wall is provided with an upwardly and rearwardly-curved stop 19 at each side, on which the side frames of the cab seat when the cab is thrown back from over the bed to the dotted position shown in Fig. 2. In this position of the cab an open conveyance is provided. The cab is secured when swung to normal position over the bed, by suitable fasteners, such as hooks 20, pivoted at the inside on the opposite side walls of the bed near the front, the hooks engaging inwardly-projecting pins 21 fixed to the cab frame. The top of the cab preferably curves from front to rear and is extended a substantial distance beyond the front wall to keep out the weather. In practice, the frame of the cab is constructed of wood, with iron braces at the angles, the same insuring strength and rigidity, while enabling the cab to be built relatively light.

Having thus described my invention, I claim as new and desire to secure by Letters Patent;

1. The combination in a vehicle body, of a bed, and a cab having a rigid frame hinged at its rear bottom edge to swing as a unit from over the bed said cab being constructed and arranged to form in connection with the bed a substantially closed vehicle body when the cab is in operative position.

2. The combination in a vehicle body, of a bed having a dash-board, a cab arranged on the bed close to the dash board, and hinges connecting the bed and cab together at the lower and rear edge of the cab.

3. The combination in a vehicle body, of a bed having a dash-board, a cab having a rigid frame seated on the bed and arranged close to the dash-board, hinges connecting the cab at its bottom rear edge to the bed, and stops secured to the rear end of the bed to support the cab when swung from over the bed on the hinges.

4. The combination in a vehicle, of a bed, and a non-collapsible cab arranged to seat on and cover the bed, having a top side and rear walls, with the cab hinged to swing as a unit to a removed position from over the bed.

5. The combination in a vehicle, of a bed, and a non-collapsible cab adapted to seat on the bed and in connection therewith inclose the forward portion of the vehicle, said cab being hinged to the bed to swing to a removed position to admit of passage to and from the vehicle.

6. The combination in a vehicle, of a bed having a floor, side walls and a front wall, with the front wall upwardly extended to provide a dash-board, and a cab having side walls and a front wall arranged to seat on the side walls of the bed, with the front wall thereof forming a continuation of the dash-board, said cab being constructed and mounted to move as a unit from the dash-board to admit of passage to and from the vehicle.

7. The combination in a vehicle, of a box bed having a floor, side walls and a front wall, and a non-collapsible cab arranged to seat on the side walls of the bed and extend to the front wall thereof, said cab being constructed and mounted to swing as a unit to and from the front wall of the bed over said floor.

In testimony whereof I have signed my name to this specification in the presence of two subscribing witnesses.

DAVIS J. KERSTETTER.

Witnesses:
E. E. DURAND,
J. E. BAGBY.